(12) United States Patent
Trautmann

(10) Patent No.: US 6,964,217 B2
(45) Date of Patent: Nov. 15, 2005

(54) MULTISPINDLE LATHE

(75) Inventor: Guenther-Heinrich Trautmann, Kirchheim (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 0 days.

(21) Appl. No.: 11/004,604

(22) Filed: Dec. 3, 2004

(65) Prior Publication Data

US 2005/0126353 A1    Jun. 16, 2005

Related U.S. Application Data

(63) Continuation of application No. PCT/EP03/05617, filed on May 28, 2003.

(30) Foreign Application Priority Data

Jun. 7, 2002    (DE) .............................. 102 26 272

(51) Int. Cl.⁷ .......................................... B23B 13/04
(52) U.S. Cl. ............................. 82/129; 82/159; 82/162
(58) Field of Search ....................... 82/129, 141, 147, 82/138, 159, 162; 29/50, 56.6

(56) References Cited

U.S. PATENT DOCUMENTS

| | | | | |
|---|---|---|---|---|
| 4,704,773 A | * | 11/1987 | Quinart et al. ............... | 29/27 C |
| 5,054,176 A | * | 10/1991 | Wachter ........................ | 29/40 |
| 5,127,291 A | * | 7/1992 | Lothammer ................... | 82/120 |
| 5,392,501 A | * | 2/1995 | Sonnek ......................... | 29/27 C |
| 5,697,270 A | | 12/1997 | Link | |
| 6,079,090 A | * | 6/2000 | Ongaro ......................... | 29/27 C |
| 6,324,949 B1 | | 12/2001 | Link et al. | |

FOREIGN PATENT DOCUMENTS

| | | |
|---|---|---|
| DE | 23 35 605 | 1/1974 |
| DE | 100 16 897 | 10/2001 |

* cited by examiner

*Primary Examiner*—Willmon Fridie, Jr.
(74) *Attorney, Agent, or Firm*—Lipsitz & McAllister, LLC

(57) ABSTRACT

In order to improve a multispindle lathe comprising a machine frame, a rotatably mounted spindle drum, at least two workpiece spindles arranged in the spindle drum with their workpiece receiving means rotatable about a respective spindle axis, a plurality of spindle stations provided stationarily on the machine frame, into which the workpiece spindles are adapted to be brought, such that removal of workpieces in the workpiece removal station, which can take place very quickly, is possible with simple means, it is proposed that a rotatable workpiece receiving means be allocated to the workpiece removal station, the workpiece receiving means being movable by means of a carrier device relative to the workpiece spindle located in a workpiece removal station between a workpiece take-over position, in which the axis of the workpiece receiving means extends coaxially with the spindle axis of the workpiece spindle located in the workpiece removal station, and a workpiece delivery position, and the workpiece receiving means being movable by means of the carrier device in a Z direction.

31 Claims, 13 Drawing Sheets

MULTISPINDLE LATHE

This application is a continuation of international application number PCT/EP03/05617 filed on May 28, 2003.

The present disclosure relates to the subject matter disclosed in International Application PCT/EP03/05617 of May 28, 2003, which is incorporated herein by reference in its entirety and for all purposes.

BACKGROUND OF THE INVENTION

The invention relates to a multispindle lathe comprising a machine frame, a spindle drum mounted on the machine frame for rotation about a spindle drum axis, at least two workpiece spindles arranged in spindle positions in the spindle drum with their workpiece receiving means rotatable about a respective spindle axis, a work area arranged at the end face of the spindle drum and the workpiece spindles, a plurality of spindle stations provided stationarily on the machine frame, into which the workpiece spindles are adapted to be brought by rotation of the spindle drum about the spindle drum axis, some of the spindle stations being designed as machining stations for machining the workpieces therein, and at least one of the spindle stations being designed as workpiece removal station.

Generally the problem with such multispindle lathes is that the machining of the workpieces is extremely time-critical, i.e., the operations have to be optimized to save fractions of seconds in order to achieve optimum economic operation of these multispindle lathes.

It is also necessary to make only extremely short times available for removal of the workpieces in the workpiece removal station if one is to prevent removal of the workpieces and possibly additional machining thereof in the workpiece receiving means from requiring times that are longer than the machining times in the machining stations and hence time being wasted in the other machining stations owing to removal of the workpieces.

It is known to optimize workpiece removal by allocating opposite to the spindle drum with the workpiece spindles a spindle drum with opposed spindles, but such a solution is costly.

The object underlying the invention is, therefore, to so improve a multispindle lathe of the kind described at the outset that removal of workpieces in the workpiece removal station, which can take place very quickly, is possible with simple means.

SUMMARY OF THE INVENTION

This object is accomplished, in accordance with the invention, in a multispindle lathe of the kind described at the outset in that a workpiece receiving means rotatable about an axis is allocated to the workpiece removal station, the workpiece receiving means being movable by means of a carrier device arranged on the machine frame relative to the workpiece spindle located in the workpiece removal station with at least one directional component extending radially to the spindle drum axis between a workpiece take-over position, in which the axis of the workpiece receiving means extends coaxially with the spindle axis of the workpiece spindle located in the workpiece removal station, and a workpiece delivery position, and the workpiece receiving means being movable by means of the carrier device in a Z direction parallel to the spindle axis of the workpiece spindle located in the workpiece removal station.

The advantage of the inventive solution is that provision of a rotatable workpiece receiving means makes it possible to remove as quickly as possible within as short times as possible workpieces in the workpiece removal station from the workpiece spindle of the spindle drum standing in the workpiece removal station, thereby enabling rapid indexing of the spindle drum.

So far, no details of the mounting of the carrier device have been given. In an expedient embodiment, provision is made for the carrier device to be mounted on the machine frame outside a spatial area starting from an end face of the spindle drum and extending away from the spindle drum. Such mounting of the carrier device has the advantage that it does not impede accessibility to the end face of the spindle drum facing the work area and thus also enables advantageous accessibility to the workpieces and tools arranged on this side of the spindle drum.

It is particularly expedient for the carrier device to be mounted on the machine frame on the same side of the work area as the spindle drum, so that the carrier device can be mounted on the machine frame in a constructionally expedient manner.

It is expedient for the carrier device to be mounted on a stand of the machine frame bearing the spindle drum, so that no additional components are required on the machine frame for mounting the carrier device.

An expedient solution provides for the carrier device to comprise a carrying arm mounted in a carrying arm holder on the machine frame, so that a constructionally simple mounting of the carrier device on the machine frame is possible.

In principle, the carrying arm can be arranged stationarily in the carrying arm holder. However, a particularly expedient solution provides for the carrying arm to be mounted on the machine frame for displacement in the carrying arm holder in a direction parallel to a spindle axis of the workpiece spindle located in the workpiece removal station, so that movement of the rotatable workpiece receiving means held by the carrier device in the direction of the Z axis can already be brought about by the carrying arm and the carrying arm holder.

So far, no details have been given as to the further design of the carrier device, in particular, no details as to how movability of the workpiece receiving means at least in a radial direction in relation to the drum axis can be brought about with the carrier device.

In principle, it is conceivable to provide the carrier device with a slide system. However, a particularly expedient solution provides for the carrier device to comprise an arm pivotable about a pivot axis relative to the machine frame. Movability in a radial direction in relation to the spindle drum can be brought about in a simple way and with little space requirement with such a pivotable arm.

In particular, the pivot axis extends approximately parallel to the spindle drum axis in order to achieve space-saving kinematics.

In the case of a carrier device provided with a carrying arm, it is possible to mount the carrying arm in the carrying arm holder also for rotation about the pivot axis.

However, a particularly expedient solution provides for the arm to be pivotable about the pivot axis relative to the carrying arm, so that the carrying arm itself can be held non-rotatably and thus in a stable manner in the carrying arm holder.

In the simplest case, the arm can be designed as an inherently rigid arm, so that the workpiece receiving means is movable with the carrying arm on a circular arc about the pivot axis.

If a more complex form of movement of the workpiece receiving means is to be able to be brought about, it is conceivable to also provide a slide on the arm, so that a linear movement can be superimposed upon the pivotal movement.

However, a particularly expedient solution provides for the arm to be designed as a jointed arm and to comprise two sectional arms movable relative to each other about a joint, with the rotatable workpiece receiving means being held on that sectional arm which does not extend towards the pivot axis.

A complex path of movement of the rotatable workpiece receiving means can be brought about in a particularly simple way with such a jointed arm.

So far, no details of the design of the rotatable workpiece receiving means have been given. In principle, it is sufficient for the workpiece receiving means to be freely rotatable or at least rotatably driveable relative to the carrier device.

A particularly expedient solution in view of the multiplicity of possibilities of use does, however, provide for the rotatable workpiece receiving means to be arranged on an opposed spindle.

The opposed spindle makes it possible to cut off a workpiece, i.e., to sever it from bar stock without a peg or protrusion of material remaining thereon. It is particularly advantageous for the opposed spindle to be configured as a synchronized spindle, i.e., for it to be capable of being operated at the same rotational speed as the workpiece spindle located in the workpiece removal station.

The provision of an opposed spindle also makes it possible, where required, to machine the workpiece in the area of its cutoff side.

If in the machining of the workpiece in the area of its cutoff side, more extensive machining than pure turning operations is to be carried out, provision is preferably made for the opposed spindle to be provided with a C axis controllable by a machine control.

In order—as mentioned hereinabove—to be able to cut off the workpiece in the workpiece removal station, provision is preferably made for a cutoff tool to be allocated to the workpiece removal station.

Such a cutoff tool can be expediently allocated to the workpiece removal station by a cutoff slide being provided therein.

If the workpiece removed from the workpiece spindle in the workpiece removal station is also to be machined, in particular, in the area of its cutoff side, provision is preferably made for the workpiece receiving means to be adapted to be brought not only into the workpiece take-over position and the workpiece delivery position, but also into a machining position.

For example, machining by a driven tool could also be carried out in such a machining position. If turning is to be carried out, the rotatable workpiece receiving means is to be configured as opposed spindle and a conventional turning tool provided in the machining position.

In order to machine the workpiece in the machining position in such a way that the workpiece machining is not hindered by the workpiece spindles provided in the spindle drum, the machining position is preferably arranged radially outwardly of the spindle drum with respect to the drum axis.

An expedient embodiment provides for the machining position to be arranged on a side of the pivot axis opposite the spindle drum.

Very different possibilities are conceivable for the tools provided in the machining position. For example, it is conceivable to provide movable tools, for example, tools movable by a slide, in the machining position.

However, since the carrier device already provides sufficient movability of the rotatable workpiece receiving means, with a view to a solution which is constructionally as simple as possible, at least one stationary tool is provided in the machining position. This can be a fixed or also a rotating tool.

So far, no details have been given of the movability of the rotatable workpiece receiving means and the space provided therefor. A particularly expedient solution provides for the workpiece receiving means to be movable in a spatial area lying between two planes which intersect the spindle drum axis and include between them an angle of less than 360° divided by the number of spindle positions.

The position of the planes themselves is not exactly defined. One possibility provides for at least one plane to extend through the spindle drum axis and the pivot axis of the carrier device.

Another solution provides for the planes to extend through the spindle drum axis and on both sides of tools allocated to the machining position, so that these tools lie within the spatial area.

A solution is particularly expedient in which the workpiece receiving means is movable with its axis on a path extending close to a plane extending through the spindle drum axis and the spindle axis of the workpiece spindle located in the workpiece removal station.

Especially when machining of the workpiece is to be carried out in the area of its cutoff side, a particularly expedient solution of the inventive multispindle lathe provides for two rotatable workpiece receiving means, each movable with a carrier device relative to the machine frame, to be allocated to the workpiece removal station.

With this solution, workpieces are more expediently removable from the workpiece removal station and additionally machinable without the workpiece spindles provided in the spindle drum being detrimental to the machining of the workpieces with respect to timing.

In order to move the workpieces in as space-saving a manner as possible between the workpiece take-over position and the workpiece delivery position, provision is preferably made for the two rotatable workpiece receiving means to be movable with their axis on paths extending close to the plane through the spindle drum axis and through the spindle axis of the workpiece spindle located in the workpiece removal station.

Workpiece removal in the workpiece removal station from the workpiece spindle of the spindle drum located in the workpiece removal station was primarily dealt with in the above explanation of the inventive solutions. However, the inventive solution is not limited to this. In the same way as workpiece removal, insertion of a workpiece into the workpiece spindle can also be carried out in the workpiece removal station, for example, after previous removal of a workpiece.

In this case, the at least one rotatable workpiece receiving means is not movable into the described positions but alternatively or additionally into a workpiece receiving position in which the workpiece is taken over from a feeding device for insertion into the workpiece spindle.

The object set forth at the outset is, therefore, also accomplished by a multispindle lathe comprising a machine frame, a spindle drum mounted on the machine frame for rotation about a spindle drum axis, at least two workpiece spindles arranged in spindle positions in the spindle drum with their workpiece receiving means rotatable about a respective spindle axis, a work area arranged at the end face of the spindle drum and the workpiece spindles, a plurality of spindle stations provided stationarily on the machine frame, into which the workpiece spindles are adapted to be brought by rotation of the spindle drum about the spindle drum axis, some of the spindle stations being designed as machining stations for machining the workpieces therein, and at least one of the spindle stations being designed as workpiece insertion station, wherein, in accordance with the invention, a workpiece receiving means rotatable about an axis is allocated to the workpiece insertion station, the workpiece receiving means being movable by means of a carrier device arranged on the machine frame relative to the workpiece spindle located in the workpiece insertion station with at least one directional component extending radially to the spindle drum axis between a workpiece hand-over position, in which the axis of the workpiece receiving means extends coaxially with the spindle axis of the workpiece spindle located in the workpiece insertion station, and a workpiece receiving position, and said workpiece receiving means being movable by means of the carrier device in a Z direction parallel to the spindle axis of the workpiece spindle located in the workpiece insertion station.

Further embodiments of such a multispindle lathe are designed in accordance with the embodiments described hereinabove.

Further features and advantages of the invention are the subject of the following description and the drawings of some embodiments.

DETAILED DESCRIPTION OF THE INVENTION

Figure 1:
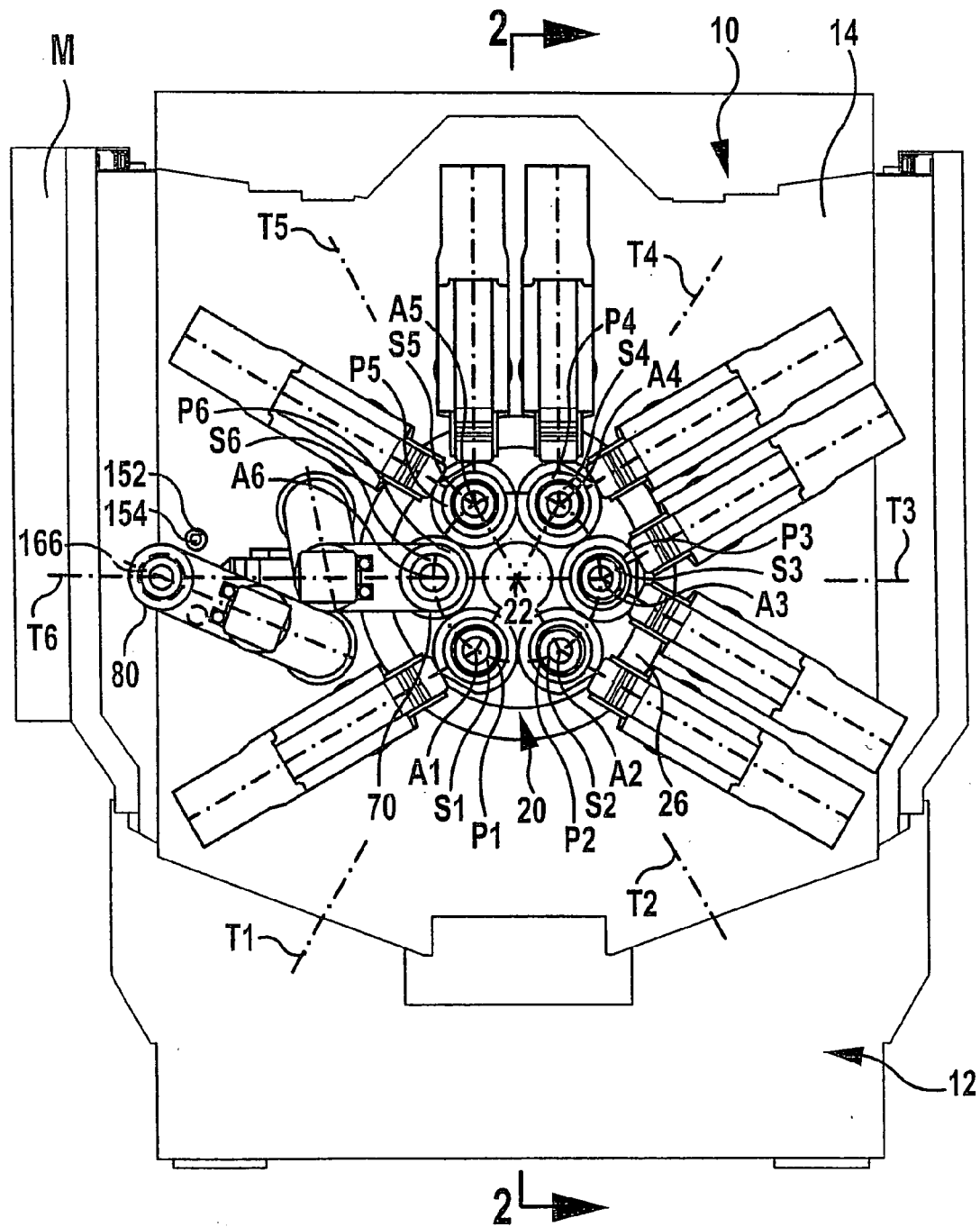
FIG. 1 is a front view of a first embodiment of an inventive machine tool with two opposed spindles with workpiece receiving means, with a first opposed spindle located in a workpiece take-over position and a second opposed spindle located in a workpiece delivery position.
Figure 2:
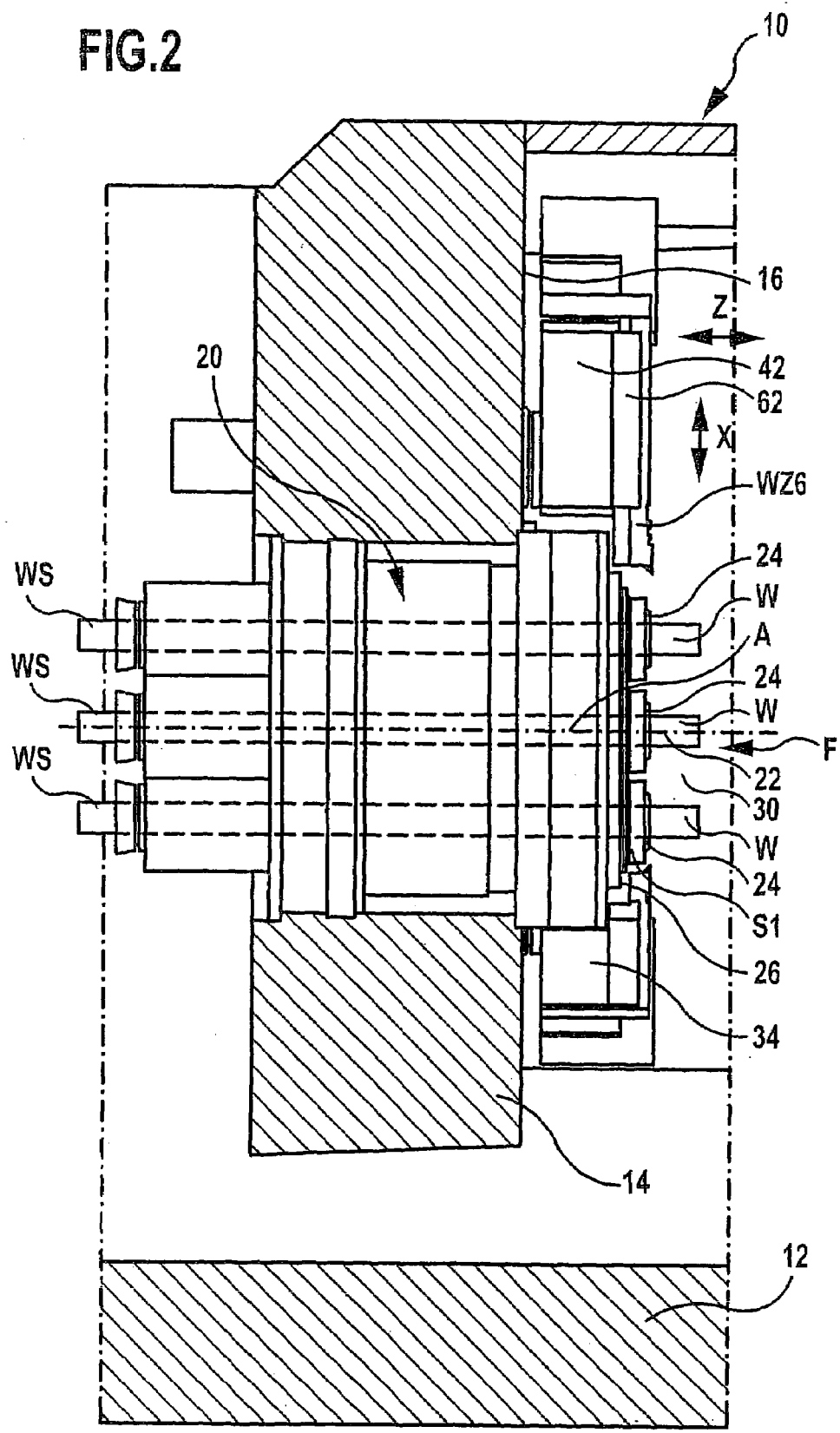
FIG. 2 shows a section taken along line 2—2 in FIG. 1.

A first embodiment of an inventive multispindle lathe, illustrated in FIGS. 1 and 2, comprises a machine frame denoted in its entirety by 10, with an underframe 12 and a stand 14 in which a spindle drum 20 is mounted for rotation about a spindle drum axis 22.

In the spindle drum 20, a plurality of workpiece spindles S1 to S6 are provided around the spindle drum axis 22 in spindle positions P1 to P6, which are preferably spaced at a distance from one another which corresponds to an angle of 360° divided by the number of workpiece spindles.

Each of the workpiece spindles S1 to S6 comprises a workpiece receiving means 24 for receiving a workpiece W. The workpiece W, as shown in FIG. 2, is formed in the first embodiment by a bar WS which is slidable through the corresponding workpiece spindle S and is preferably feedable by a magazine from a side located opposite the workpiece receiving means 24.

All workpiece spindles S1 to S6 are rotatingly drivable about their spindle axes A1 to A6 relative to the spindle drum 20 for machining the workpieces W.

Furthermore, the workpiece spindles S are preferably arranged with their spindle axes A parallel to the spindle drum axis 22 and equidistantly therefrom in the spindle drum 20. The workpiece spindles S preferably protrude from an end face 26 of the spindle drum 20 and with the workpiece receiving means 24 arranged at the end face of the workpiece spindles S face a work area 30 which is preferably arranged above the underframe 12 and in front of a front side 16 of the stand 14 extending transversely to the spindle drum axis 22, so that the workpieces W held in the workpiece receiving means 24 protrude into the work area 30 for machining.

For machining the workpieces W, the spindle drum 20 is rotatable about the spindle drum axis 22 in such a way that the workpiece spindles S are positionable in individual spindle stations T1 to T6 relative to the stand 14. The number of spindle stations T1 to T6 corresponds to at least the number of workpiece spindles S1 to S6.

The spindle stations T1 to T6 are positions provided stationarily on the stand 14 of the machine frame 10 for the individual workpiece spindles S, in which, for example, machining of the workpieces W or handling procedures relating to the workpieces W or other operations such as, for example, measuring workpieces, can be carried out.

In the first embodiment shown in FIGS. 1 to 3, the spindle stations T1 to T5 are provided as machining stations, while spindle station T6—as will be explained in detail hereinbelow—is provided as workpiece removal station.

For machining the workpieces W in the machining stations T1 to T5, tool slides 32, 34, 36, 38, 40, 42, 44 and 46 mounted on the stand 14 are allocated to these machining stations. The allocation can be carried out in different ways depending on the design of the multispindle machine tool. For example, there is allocated to the spindle stations T1 and T2 provided as machining stations only one tool slide 32 and 34, respectively. There are allocated to each of the spindle stations T3 to T5 provided as machining stations two tool slides, namely tool slides 36 and 38, 40 and 42, 44 and 46, respectively.

To cut the machined workpiece W off the bar WS in the spindle station T6 provided as workpiece removal station, a cutoff slide 48 mounted on the stand 14 and carrying a so-called cutoff tool AZ is allocated to the spindle station T6.

Figure 3:
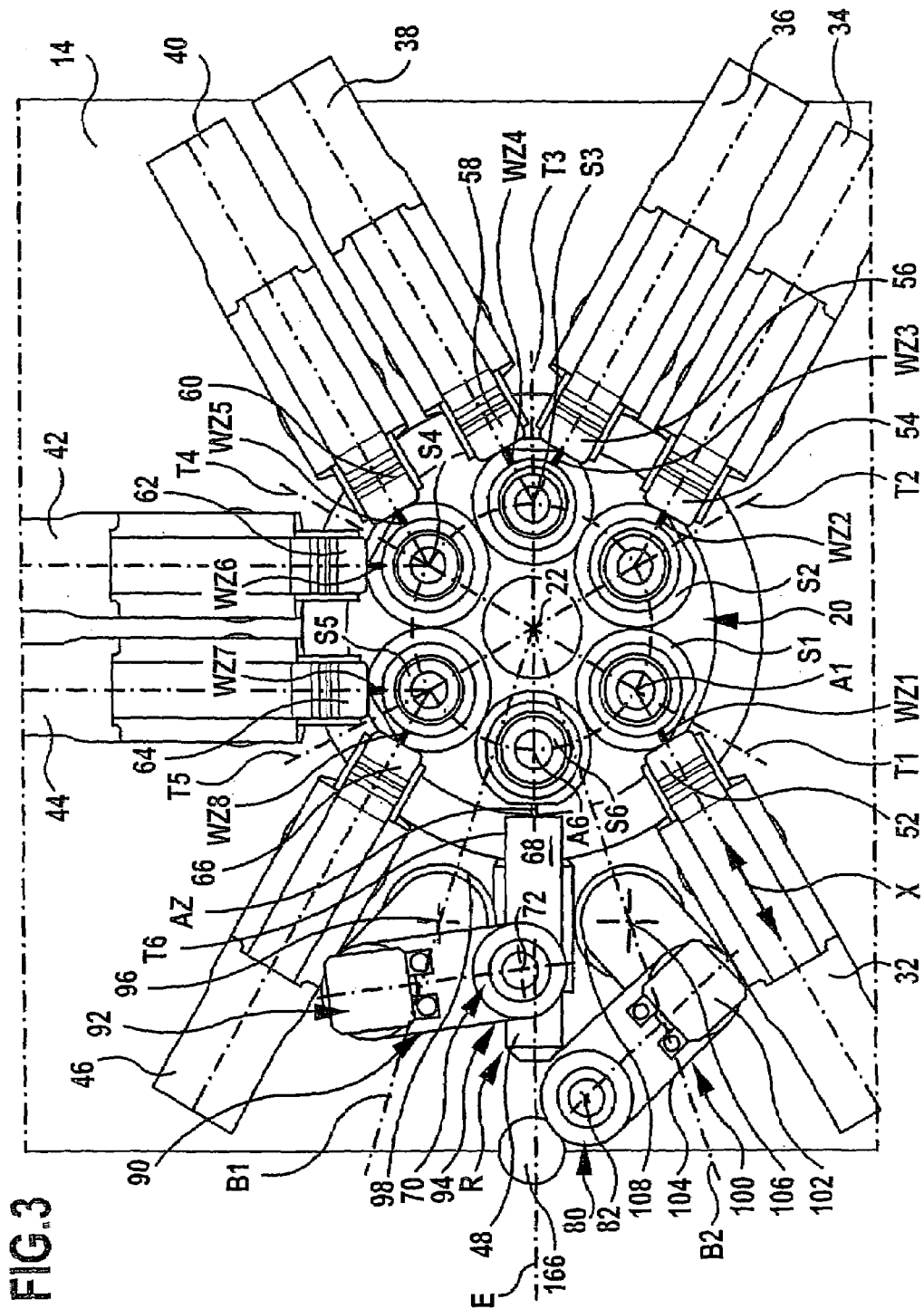
FIG. 3 shows an enlarged illustration of the front view according to FIG. 1.

All tool slides 32 to 46 are provided with tool receiving means 52 to 66 movable radially to the spindle axis A of the workpiece spindle S located in the respective spindle station T and with tools WZ1 to WZ8 held in these tool receiving means, and the cutoff slide 48 is provided with a tool receiving means 68 for the cutoff tool AZ which is also movable radially to the spindle axis A of the workpiece spindle S located in the spindle station T6 (FIG. 3).

The machining of the workpieces W is carried out in the manner known for multispindle lathes by indexing the spindle drum 20 in such a way that, for example, starting from spindle station T1, the workpiece spindle S1 passes through all spindle stations T2, T3, T4, T5 and T6, is machined in each by the tools WZ allocated thereto and then arrives in spindle station T6 with the workpiece W finished on the side protruding over the workpiece receiving means 24.

To this end, a movement, controlled by a machine control M, of the respective tool receiving means 52 to 68 is carried out in X direction, which extends radially to the spindle axis A of the workpiece spindle S located in the respective spindle station T, and, in addition, also a relative displacement, controlled by the machine control M, between the tool WZ and the workpiece W in a direction parallel to the respective spindle axis A, a Z direction. Here either the entire respective tool slide 32 to 46 is designed for displacement in Z direction relative to the stand 14 and/or the workpiece spindles S are displaceable in the direction of their spindle axes A relative to the spindle drum 20.

A first opposed spindle 70 and a second opposed spindle 80, which are configured as alternately usable synchronized spindles, are provided for cutting off in the workpiece removal station the workpiece W which is finished on this side but is still joined to the bar WS and arrives again in spindle station T6.

Each of these opposed spindles 70, 80 is movable by a carrier device 90, 100 held on the stand 14 relative to the workpiece spindle S located in the spindle station T6 and hence relative to the spindle drum 20. Their axes 72, 82 move in a range of movement, close to a plane E which extends through the spindle drum axis 22 and the spindle axis A of the workpiece spindle S located in the spindle station T6.

The range of movement of the opposed spindles 70, 80 is also preferably definable by a spatial area R between two delimiting planes B1 and B2, which both extend through the spindle drum axis 22, lie on different sides of the plane E and each include an acute angle with the plane E. The angle between the planes B1 and B2 is preferably at the most equal to the angular spacing between spindle positions P of successive workpiece spindles S of the spindle drum 20.

The carrier devices 90 and 100 for moving the opposed spindles 70 and 80 were not explained in detail in the above explanation of the first embodiment. In the first embodiment, each of the carrier devices 90 and 100 comprises a jointed arm 94 and 104, respectively, movable in a jointed manner about a joint 92 and 102, respectively. The jointed arm 94 and 104, respectively, is pivotable about a pivot axis 96 and 106, respectively, relative to a carrying arm 98 and 108, respectively, guided on the stand 14 (FIG. 3).

The carrying arms 98, 108 and the pivot axes 96, 106 are arranged radially outwardly of the spindle drum 20 and extend transversely to the front side 16 of the stand 14. The pivot axes 96, 106 are preferably aligned approximately parallel to the spindle drum axis 22, so that the jointed arms 94, 104 move in planes extending approximately parallel to the front side 16.

The carrier devices 90, 100 do thus not impede access to the end face 26 of the spindle drum 20 via the work area 30, as a clearance area F extending over the end face 26 and away from this, which, in particular, is advantageous for maintenance and adjustment operations, is not always being touched, and the opposed spindles 70, 80 only enter this in a workpiece take-over position.

Figure 4:
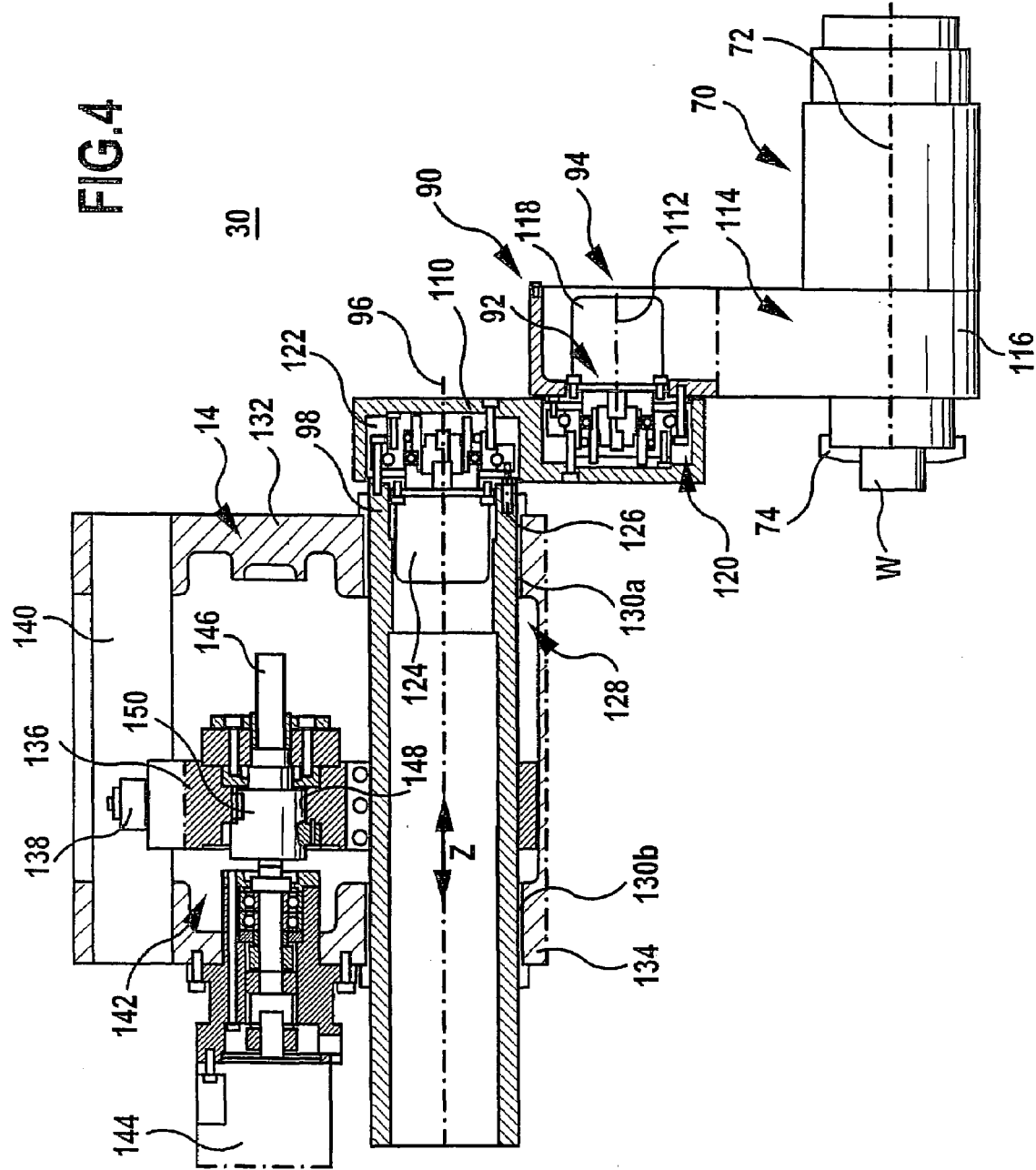
FIG. 4 shows an enlarged illustration of a carrier device with a partial section through the carrier device and an area of the machine frame bearing the carrier device.

In the illustrated embodiment, the carrier devices 90 and 100 are of substantially identical design, and, therefore, a detailed description thereof with reference to the carrier device 90 shown in FIG. 4 will apply accordingly to the carrier device 100.

As shown in FIG. 4, the jointed arm 94 comprises a first sectional arm 110 extending from the pivot axis 96 to the joint 92. A second sectional arm 114 is held in a jointed manner on the first sectional arm 110 for movement around a joint axis 112 of the joint 92. The second sectional arm 114 carries the opposed spindle 70 at its end 116 facing away from the joint 92.

The second sectional arm 114 preferably engages over the first sectional arm 110 in the area of the joint 92 on the side thereof facing away from the stand 14. Integrated, for example, in the sectional arm 114 is a drive 118 which is activatable by the machine control M. Optional joint angles between the sectional arms 110 and 114 are settable with the drive 118. A bearing unit 120 of the entire joint 92 is integrated in the area of the first sectional arm 110 adjacent to the joint 92.

Also integrated in the first sectional arm 110, in the area thereof engaging over the carrying arm 98 is a bearing unit 122 which allows the pivoting movement of the first sectional arm 110 about the pivot axis 96. The pivoting movements themselves can be effected by a drive 124 activatable by the machine control M and integrated in the carrying arm 98, in particular, in a front end 126 thereof facing the first sectional arm 110.

The carrying arm 98 is preferably of tubular design and extends through a carrying arm holder 128 provided in the stand 14. The carrying arm 98 is displaceable in the carrying arm holder 128 by means of two slide bearings 130a and 130b spaced from each other in a Z direction extending parallel to the workpiece spindle axes A.

The slide bearings 130a, 130b are preferably provided in a front side wall 132 facing the work area 30 and a rear side wall 134 of the stand 14 facing away from the work area 30, respectively.

In the illustrated embodiment, the slide bearings 130a, 130b are designed so as not to secure the carrying arm 98, which is, for example, of tubular design, in a rotationally fixed manner.

To secure the carrying arm 98 in a rotationally fixed manner in the stand 14 there engages between the slide bearings 130a, 130b on the carrying arm 98 a support arm 136 extending transversely to the carrying arm 98. At an end facing away from the carrying arm 98, the support arm 136 carries support elements, for example, support rollers 138 which include between them a guide 140 which extends parallel to the Z direction, so that the support rollers 138 are movable along the guide 140 when the carrying arm 98 moves in the Z direction. The support elements 138 preferably slide along the guide 140 free from play.

By way of this support arm 136 movable along the guide 140, the carrying arm 98 is thus mounted in a rotationally fixed manner in the stand 14 with simultaneous movability of the carrying arm 98 along the Z direction.

A displacement drive denoted in its entirety by 142 is provided for displacing the carrying arm 98 in Z direction. The displacement drive 142 comprises a drive motor 144 activatable by the machine control M, with which a spindle 146 is drivable, which passes through the support arm 136 in the area of an opening 148 and extends through a spindle nut 150 which is fixedly connected to the support arm 136.

The displacement drive 142 thus acts on the support arm 136 and via this on the carrying arm 98 to carry out the controlled movement thereof in Z direction.

By way of the controlled displaceability of the carrying arm 98 in Z direction, the controlled pivoting of the jointed arm 94 about the pivot axis 96 and the controlled movement of the jointed arm 94 about the joint 92, the opposed spindle 70 is thus movable both in Z direction and in X direction relative to the workpiece spindle S located in spindle station T6, in such a way that, as shown in FIG. 1, the opposed spindle 70 is alignable with its spindle axis 72 coaxially with the spindle axis A of the workpiece spindle S located in spindle station T6, so that in this workpiece take-over position, for example, the machined workpiece W present in workpiece spindle S1 can be gripped on its finished side by means of a workpiece receiving means 74 provided on the opposed spindle 70, and by driving the opposed spindle 70 synchronously with the workpiece spindle S, the workpiece W finished on one side can be cut off from the bar WS.

Figure 5:
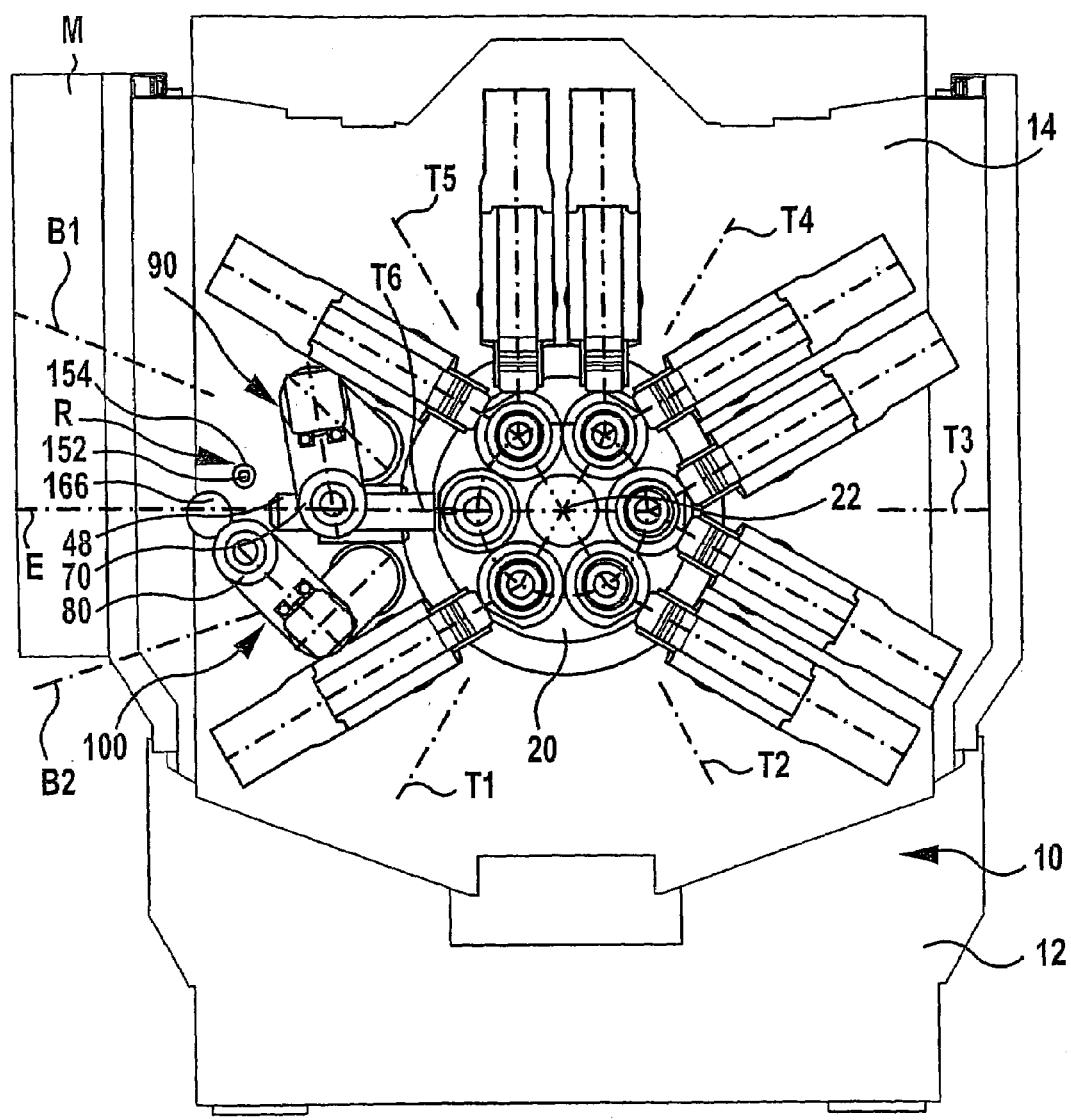
FIG. 5 is a view similar to FIG. 1 wherein the first opposed spindle has left the workpiece take-over position in the direction of the workpiece delivery position and the second opposed spindle has also left the workpiece delivery position.

After the cutting off, the workpiece W finished on one side is held by the workpiece receiving means 74 in the opposed spindle 70 and by moving the opposed spindle 70 near the plane E and within the spatial area R fixed by the planes B1 and B2 is moved approximately radially to the workpiece spindle S located in spindle station T1 and approximately radially to the spindle drum axis 22 outwardly away from the spindle drum 20, as shown in FIG. 5.

Figure 6:
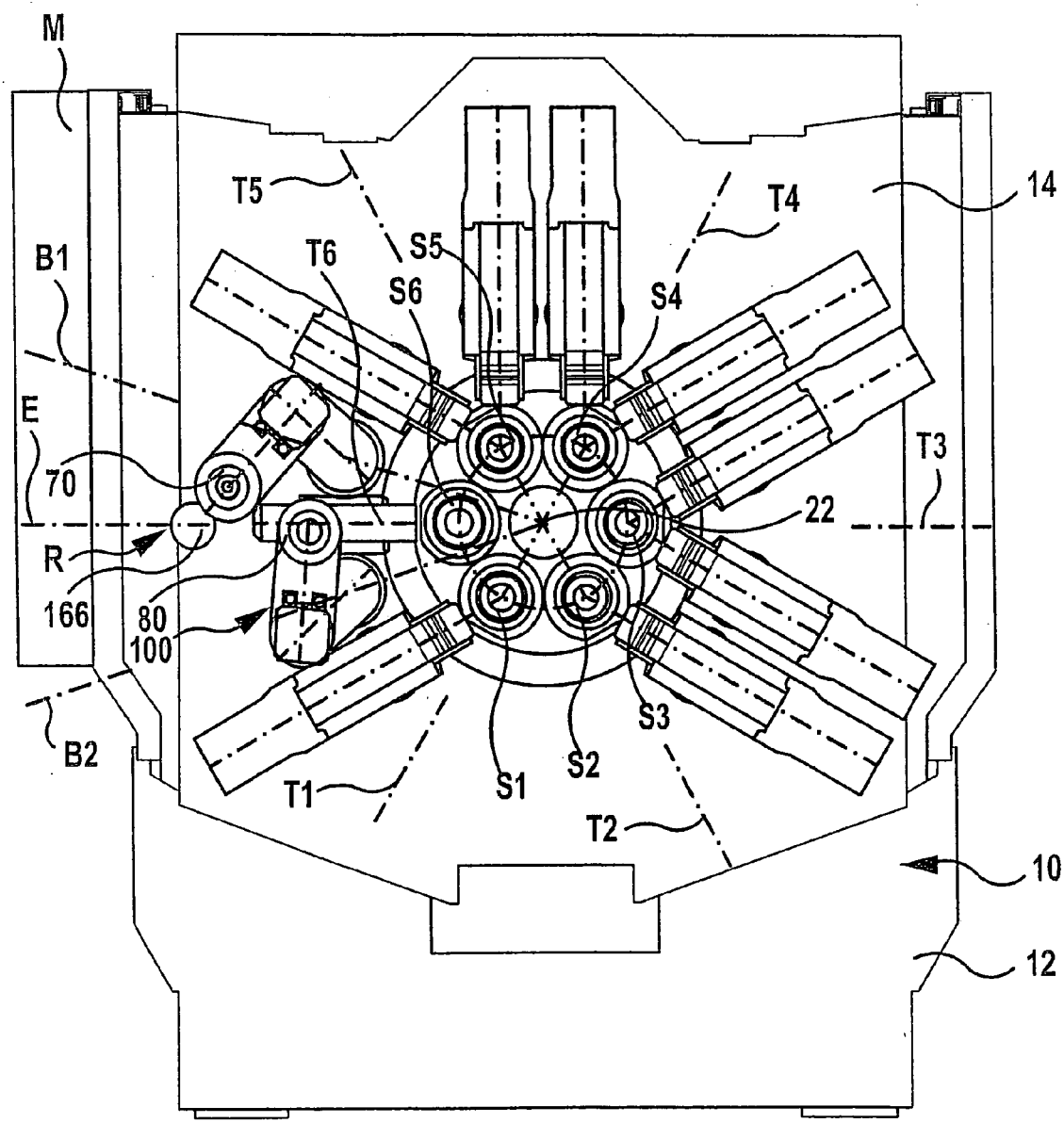
FIG. 6 is a view similar to FIG. 1 wherein the first opposed spindle is located in a machining position, while the second opposed spindle is moving in the direction of the workpiece take-over position.

To enable finishing of the cutoff side of the machined workpiece W held in the opposed spindle 70, as shown in FIG. 5, there is provided on a side of the cutoff slide 48 facing away from the spindle drum 20 and/or of the carrying arm 98 a tool holder 152 with a tool 154 in the spatial area R between the planes B1 and B2, to which, as shown in FIG. 6, the opposed spindle 70 is movable, in order to finish machining of the workpiece W held in the workpiece receiving means 74 in the area of its cutoff side in a first machining position, as shown in FIG. 6.

During this time, the machine control M can index the spindle drum.

Figure 7:
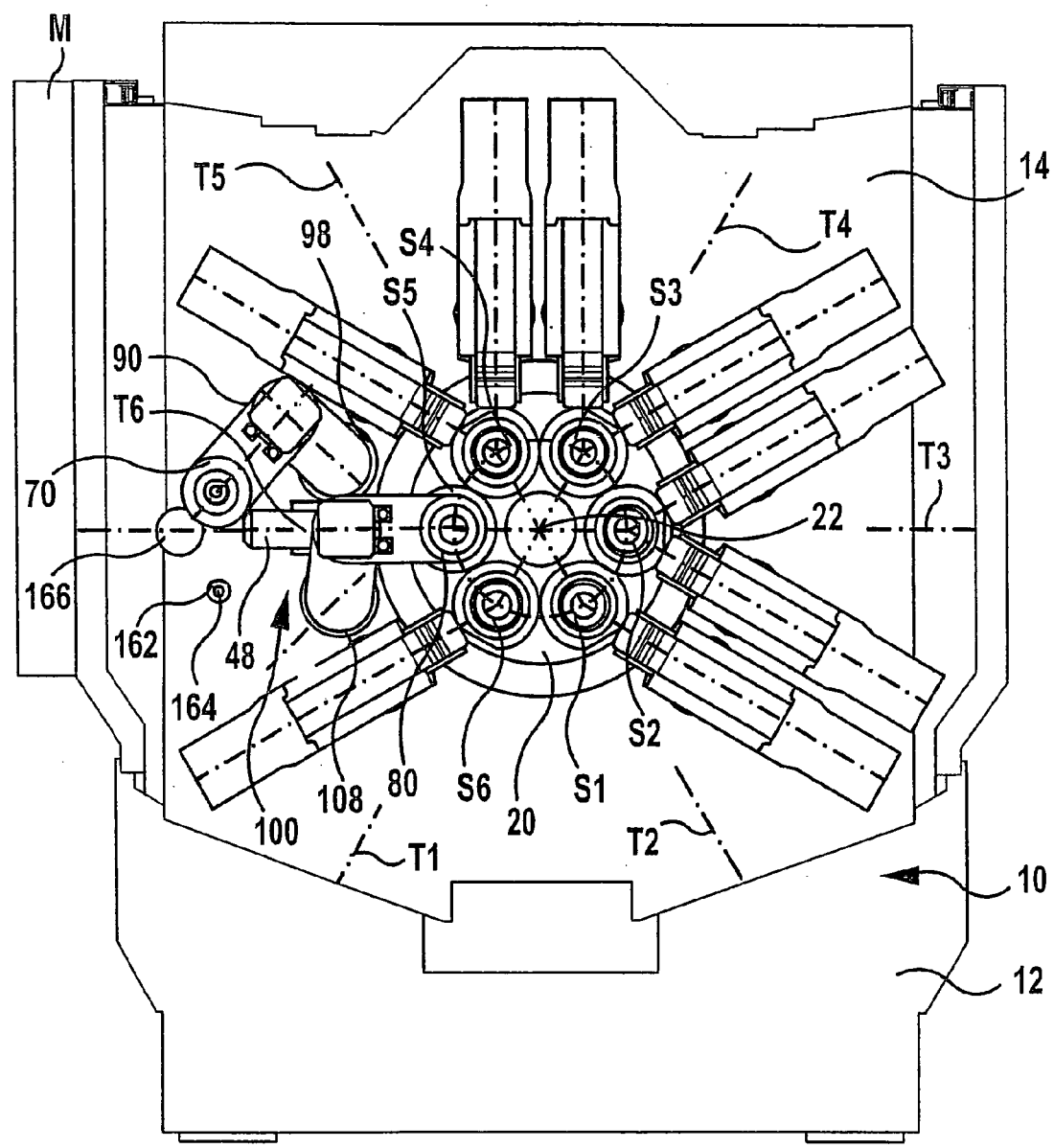
FIG. 7 is a view similar to FIG. 1 wherein the second opposed spindle is located in the workpiece take-over position and the first opposed spindle in the machining position.

At the same time, as shown in FIG. 7, the cutting-off of the next finished workpiece W can be carried out with the opposed spindle 80 in the workpiece take-over position, for example, in workpiece spindle S5, in spindle station T6.

Figure 8:
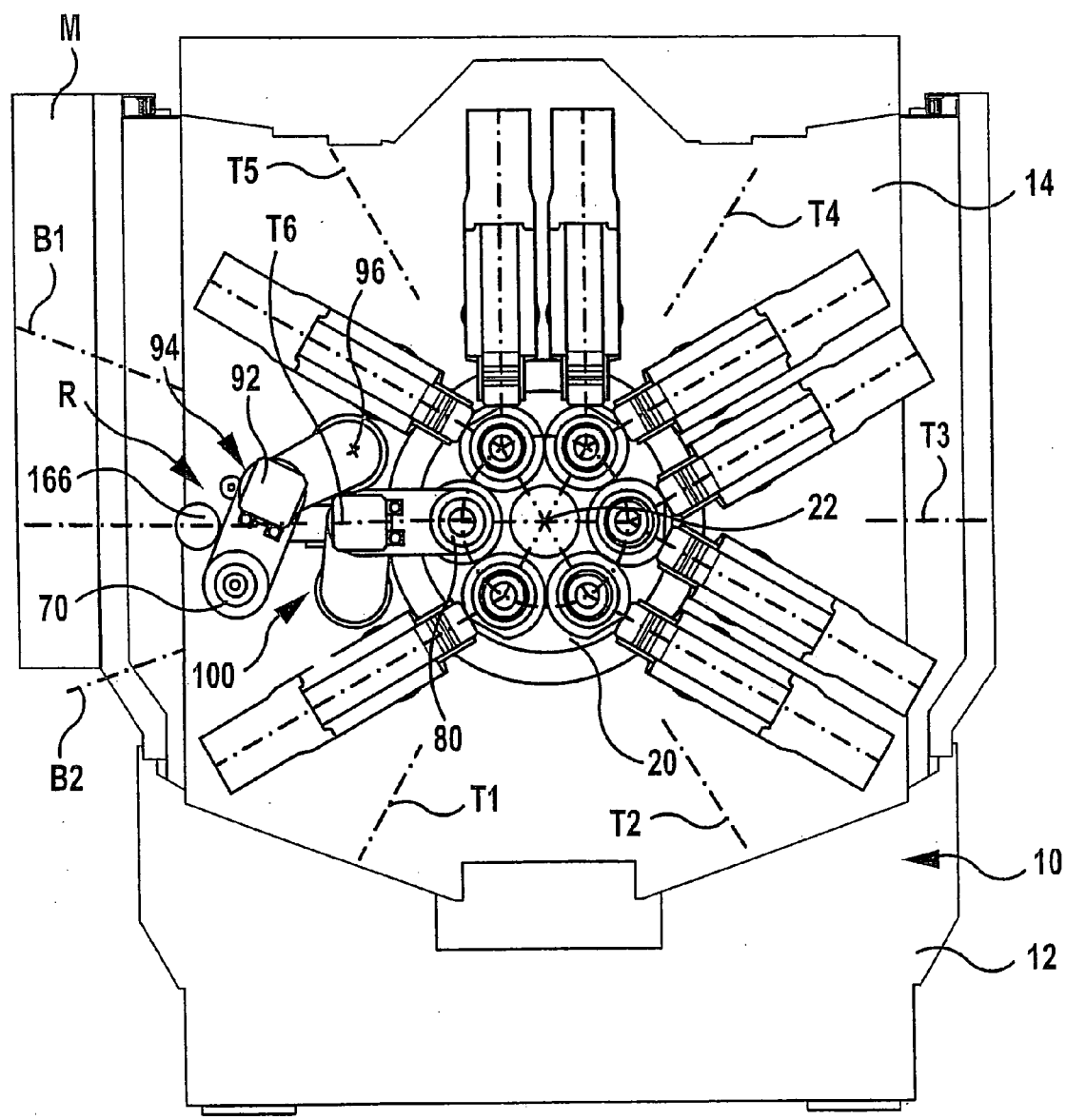
FIG. 8 is a view similar to FIG. 1 wherein the first opposed spindle is located in a further machining position and the second opposed spindle still in the workpiece take-over position.

Insofar as several tools are to be used for finishing the workpiece W in the area of its cutoff side, at least a further second tool holder 162 with a further tool 164 is provided at a side of the cutoff slide 48 facing away from the spindle drum 20 and/or of the carrying arm 108 so that, as shown in FIG. 8, the workpiece held in the opposed spindle 70 is machinable in a further machining position at this tool 164, too, by means of the opposed spindle 70, while, for example, the opposed spindle 80 is still used for the cutting-off in spindle station T6.

Figure 9:
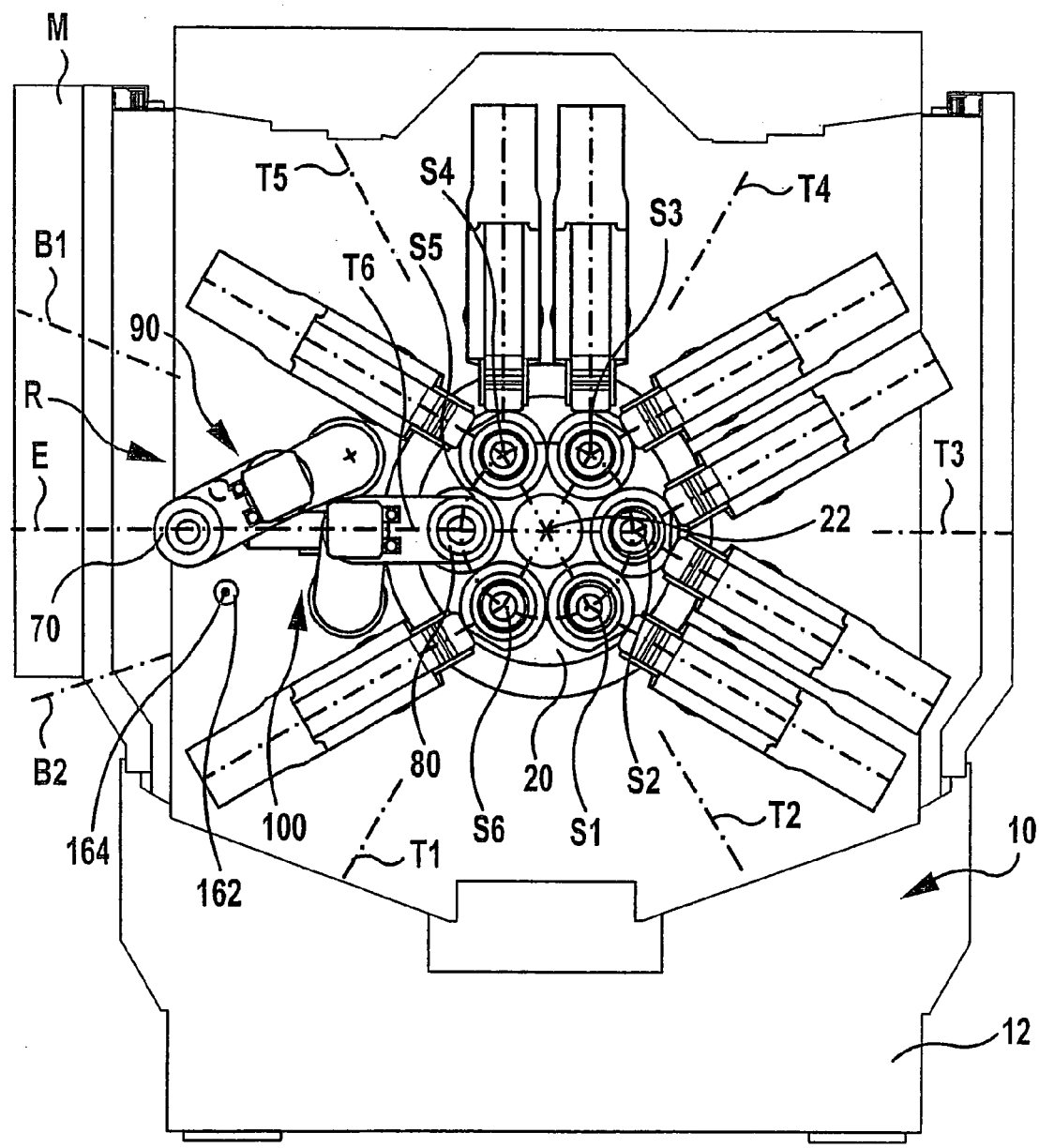
FIG. 9 is a view similar to FIG. 1 wherein the first opposed spindle is located in the workpiece delivery position and the second opposed spindle still in the workpiece take-over position.

After completion of the machining of workpiece W, the workpiece W is deposited in a workpiece removal device 166 in a workpiece delivery position, as shown in FIG. 9, and, for this purpose, the opposed spindle 70 is positionable in alignment with the workpiece removal device 166, as shown in FIG. 9.

Figure 10:
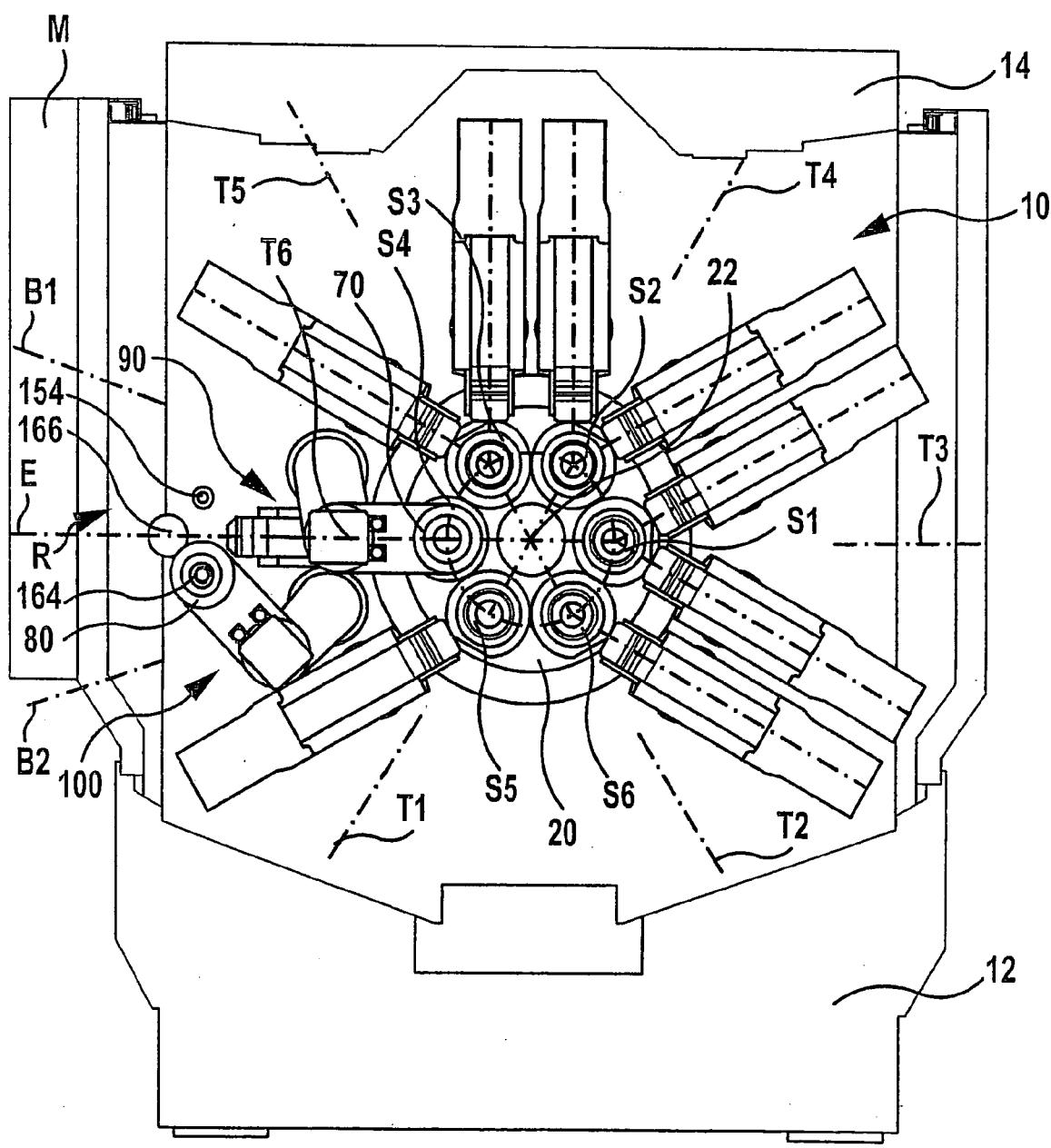
FIG. 10 is a view similar to FIG. 1 wherein the first opposed spindle is again located in the workpiece take-over position and the second opposed spindle in a machining position.
Figure 11:
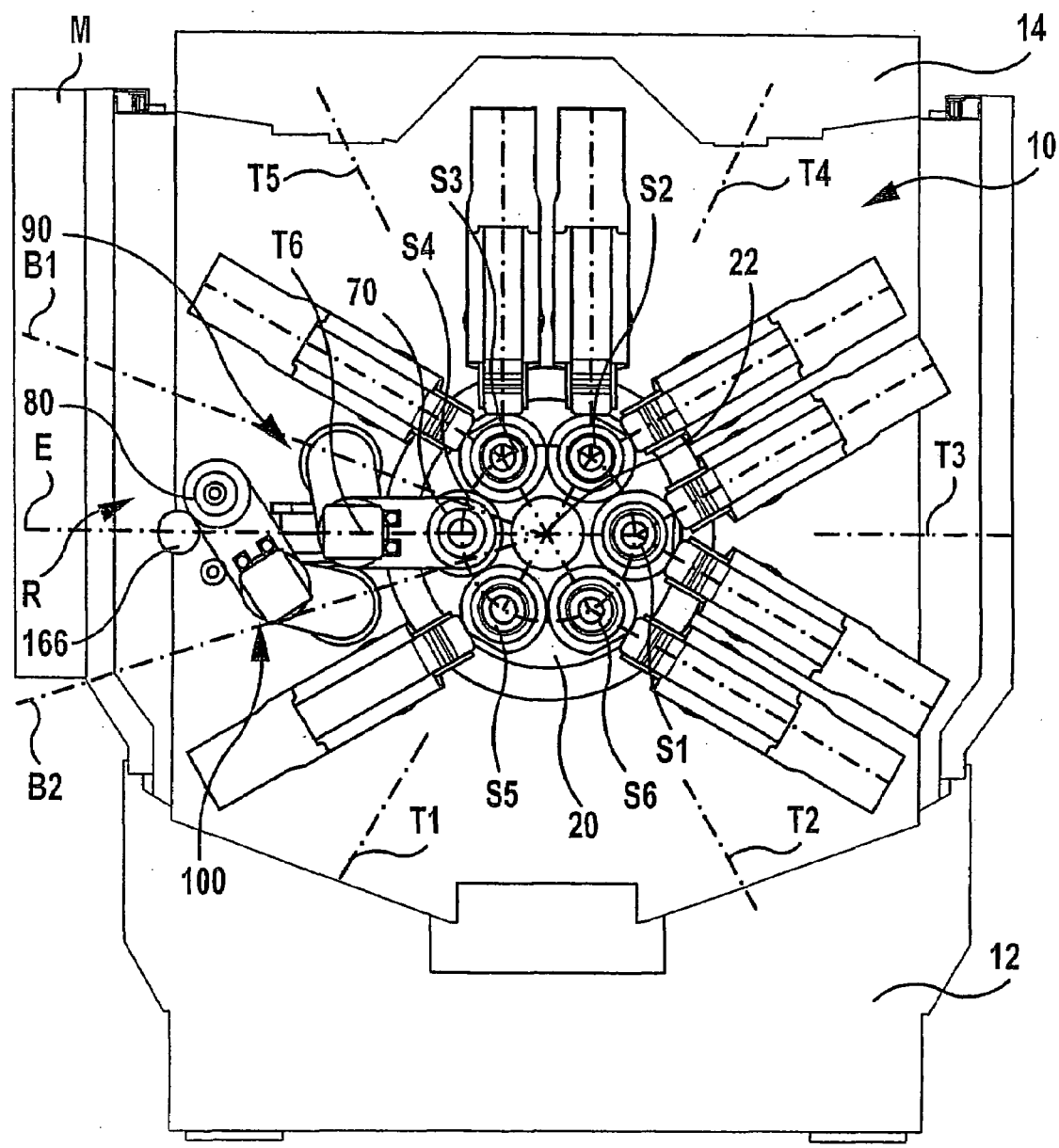
FIG. 11 is a view similar to FIG. 1 wherein the first opposed spindle is still located in the workpiece take-over position and the second opposed spindle in a further machining position.

During the machining of the workpiece W held by the opposed spindle 70 in the area of its cutoff side, the cutting-off of the following workpiece W is also completed in spindle station T6 by the opposed spindle 80, so that, as shown in FIG. 10, the opposed spindle 70 can again be used for cutting off the next workpiece W in workpiece spindle S4 located in spindle station T6, while the workpiece W held and cut off by the opposed spindle 80 can be machined by the tools 154 and 164, as shown in FIGS. 10 and 11.

As shown in FIG. 1, this workpiece is then deposited again by the opposed spindle 80 being suitably aligned with the workpiece removal device 166, as shown in FIG. 1.

It is thus possible, as a result of the two opposed spindles 70 and 80, without loss of time during the machining of the workpieces W held in the workpiece spindles S of the spindle drum 20, to carry out a cutting-off operation in workpiece removal station T6 and, at the same time, to carry out a so-called rear-side machining of the otherwise machined workpieces W in the area of the cutoff side, without a multispindle machine tool with opposed spindle drum and a second stand for receiving the opposed spindle drum being required therefor.

Figure 12:
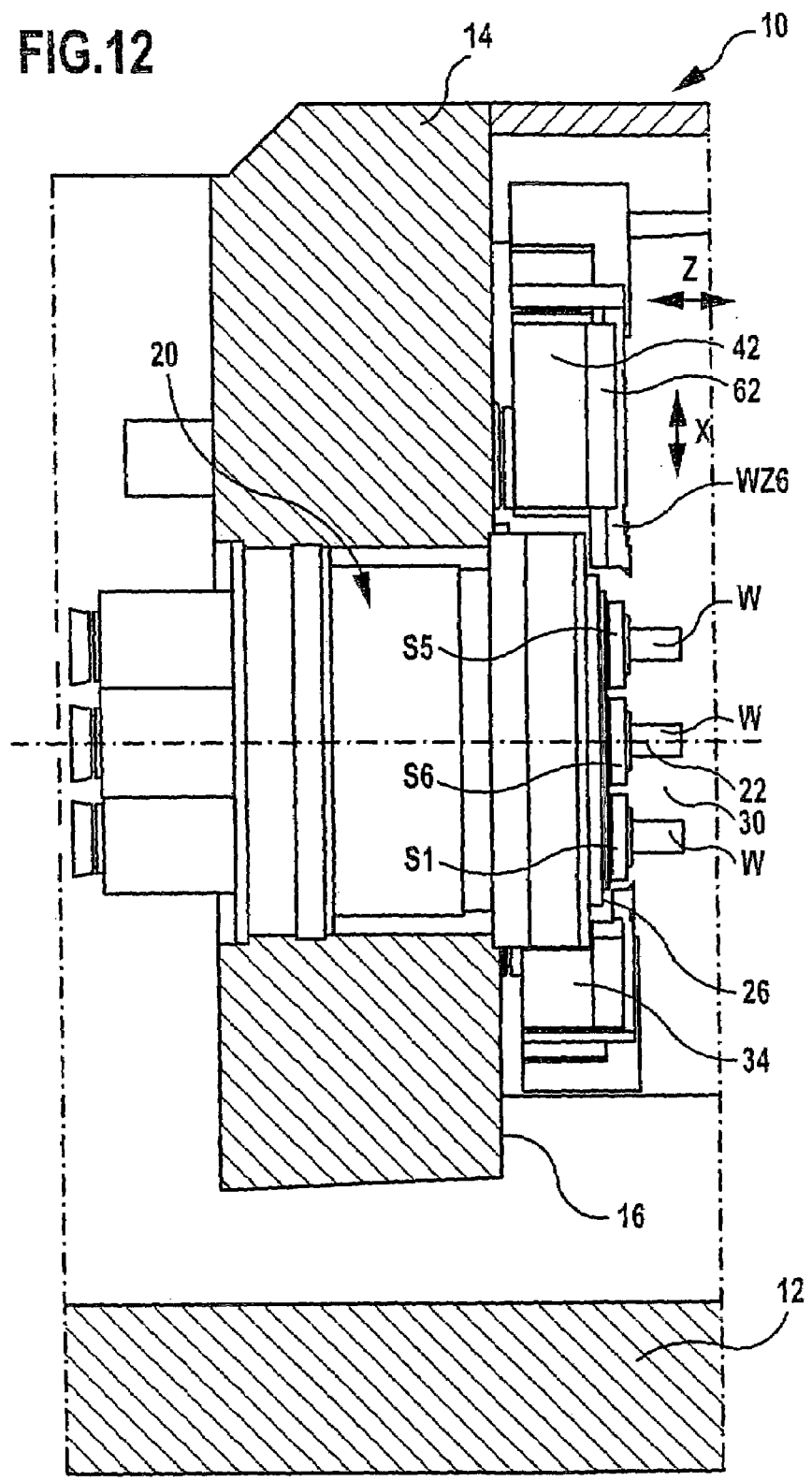
FIG. 12 shows a section similar to FIG. 2 through a second embodiment of an inventive multispindle lathe.
Figure 13:
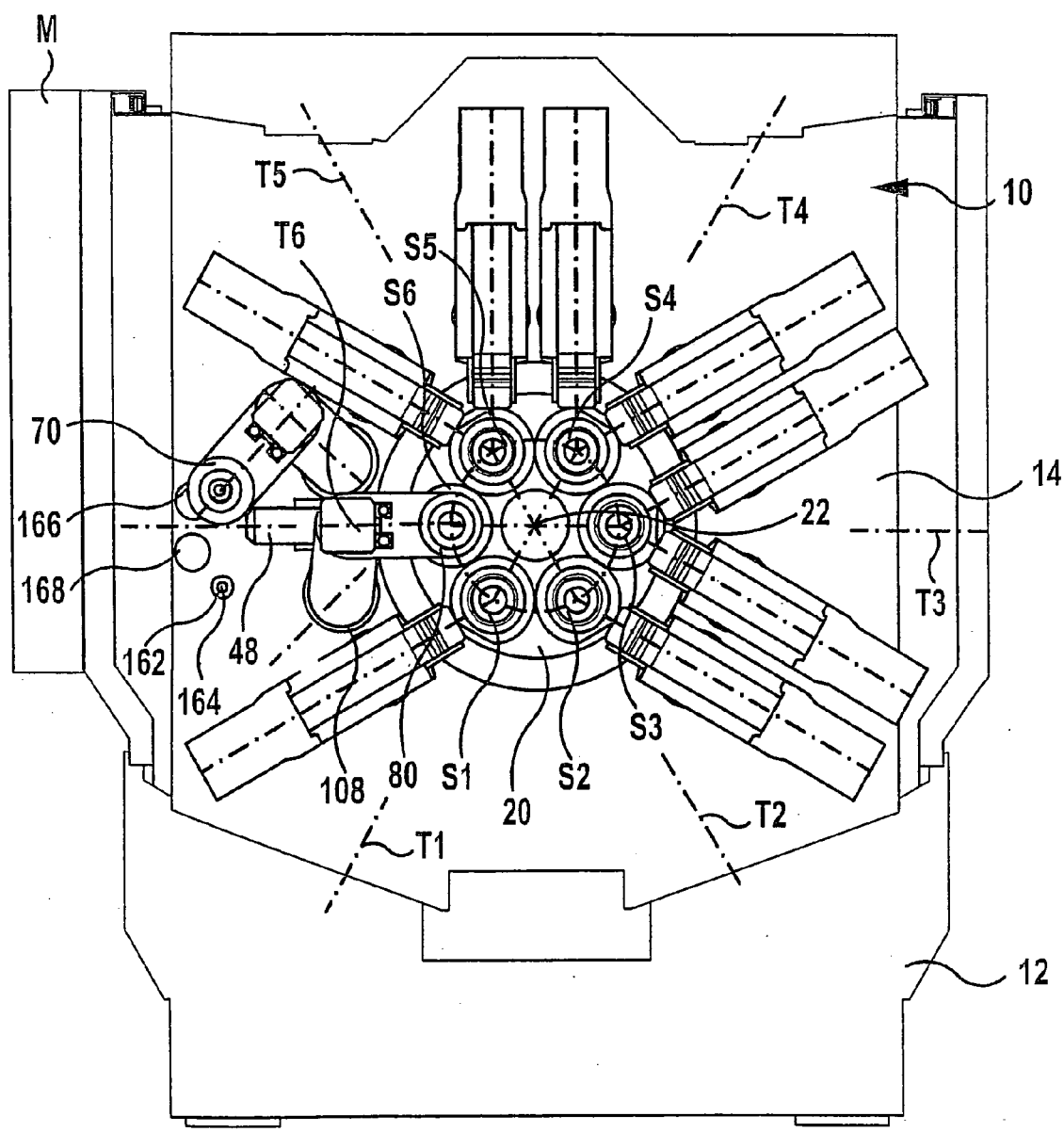
FIG. 13 is a view similar to FIG. 1 of the second embodiment of the inventive multispindle lathe.

In a second embodiment of an inventive machine tool, shown in FIGS. 12 and 13, not only a workpiece removal device 166 is provided, but also a workpiece feeding device 168, so that the workpieces W are not fed in the form of bar WS through the individual workpiece spindles S, but can be made available via the workpiece feeding device 168 and received by the opposed spindles 70 or 80 in a workpiece receiving position therein, and, for example, a first machining of the workpieces W in the tools 154 and/or 164 can already be carried out before inserting the workpieces W in the workpiece spindles S of the spindle drum 20, so as to be able to already receive the workpieces W at a machined side thereof and, proceeding from this precisely machined side, then carry out the machining during passage through all spindle stations T.

The insertion of the thus pre-machined workpieces W is also carried out in a workpiece delivery position in spindle station T6, which, in this case, is designed both as workpiece insertion station and as workpiece removal station, so that the opposed spindles 70 and 80 are, at the same time, also provided for handling and taking over finished workpieces W from the workpiece spindles S of the spindle drum 20.

After passing through the machining stations, for example, spindle stations T1 to T5, the workpiece W which has been machined on the front side can be machined again by the opposed spindles 70, 80 or the workpiece W can be directly deposited in the workpiece removal device 166.

Such workpieces W fed via the workpiece feeding device 168 are, for example, parts which are held in a chuck.

What is claimed is:

1. Multispindle lathe comprising a machine frame, a spindle drum mounted on the machine frame for rotation about a spindle drum axis, at least two workpiece spindles arranged in spindle positions in the spindle drum with their workpiece receiving means rotatable about a respective spindle axis, a work area arranged at the end face of the spindle drum and the workpiece spindles, a plurality of spindle stations provided stationarily on the machine frame, into which the workpiece spindles are adapted to be brought by rotation of the spindle drum about the spindle drum axis, some of the spindle stations being designed as machining stations for machining the workpieces therein, and at least one of the spindle stations being designed as workpiece removal station, a workpiece receiving means rotatable about an axis and allocated to the workpiece removal station, said workpiece receiving means being movable by means of a carrier device arranged on the machine frame relative to the workpiece spindle located in the workpiece removal station with at least one directional component extending radially to the spindle drum axis between a workpiece take-over position, in which the axis of the workpiece receiving means extends coaxially with the spindle axis of the workpiece spindle located in the workpiece removal station, and a workpiece delivery position, and said workpiece receiving means being movable by means of the carrier device in a Z direction parallel to the spindle axis of the workpiece spindle located in the workpiece removal station.

2. Multispindle lathe in accordance with claim 1, wherein the carrier device is mounted on the machine frame outside a spatial area extending in front of an end face of the spindle drum and away from the spindle drum.

3. Multispindle lathe in accordance with claim 1, wherein the carrier device is mounted on the machine frame on the same side of the work area as the spindle drum.

4. Multispindle lathe in accordance with claim 3, wherein the carrier device is mounted on a stand of the machine frame bearing the spindle drum.

5. Multispindle lathe in accordance with claim 1, wherein the carrier device comprises a carrying arm mounted in a carrying arm holder on the machine frame.

6. Multispindle lathe in accordance with claim 5, wherein the carrying arm is mounted in the carrying arm holder on the machine frame for displacement in a direction parallel to a spindle axis of the workpiece spindle located in the workpiece removal station.

7. Multispindle lathe in accordance with claim 1, wherein the carrier device comprises an arm pivotable about a pivot axis relative to the machine frame.

8. Multispindle lathe in accordance with claim 7, wherein the arm is pivotable about the pivot axis relative to the carrying arm.

9. Multispindle lathe in accordance with claim 7, wherein the arm is constructed as a jointed arm and comprises two sectional arms movable relative to each other about a joint.

10. Multispindle lathe in accordance with claim 1, wherein the rotatable workpiece receiving means is arranged on an opposed spindle.

11. Multispindle lathe in accordance with claim 10, wherein the opposed spindle is a synchronized spindle.

12. Multispindle lathe in accordance with claim 1, wherein a cutoff tool is allocated to the workpiece removal station.

13. Multispindle lathe in accordance with claim 1, wherein the workpiece receiving means is adapted to be additionally brought into a machining position.

14. Multispindle lathe in accordance with claim 13, wherein the machining position is arranged radially outside of the spindle drum with respect to the spindle drum axis.

15. Multispindle lathe in accordance with claim 13, wherein at least one stationary tool is provided in the machining position.

16. Multispindle lathe in accordance with claim 1, wherein the rotatable workpiece receiving means is movable in a spatial area lying between two planes which intersect the spindle drum axis and include between them an angle of less than 360° divided by the number of spindle positions.

17. Multispindle lathe in accordance with claim 16, wherein at least one plane extends through the spindle drum axis and the pivot axis of the carrier device.

18. Multispindle lathe in accordance with claim 16, wherein the planes extend through the spindle drum axis and on both sides of tools allocated to the machining position.

19. Multispindle lathe in accordance with claim 1, wherein the rotatable workpiece receiving means is movable with its axis on a path extending close to a plane extending through the spindle drum axis and the spindle axis of the workpiece spindle located in the workpiece removal station.

20. Multispindle lathe in accordance with claim 1, wherein two rotatable workpiece receiving means, each movable with a carrier device relative to the machine frame, are allocated to the workpiece removal station.

21. Multispindle lathe in accordance with claim 20, wherein the two rotatable workpiece receiving means are each movable with their axis on paths extending close to the plane through the spindle drum axis and the spindle axis of the workpiece spindle located in the workpiece removal station.

22. Multispindle lathe in accordance with claim 1, wherein the rotatable workpiece receiving means is movable into a workpiece take-over position.

23. Multispindle lathe comprising a machine frame, a spindle drum mounted on the machine frame for rotation about a spindle drum axis, at least two workpiece spindles arranged in spindle positions in the spindle drum with their workpiece receiving means rotatable about a respective spindle axis, a work area arranged at the end face of the spindle drum and the workpiece spindles, a plurality of spindle stations provided stationarily on the machine frame, into which the workpiece spindles are adapted to be brought by rotation of the spindle drum about the spindle drum axis, some of the spindle stations being designed as machining stations for machining the workpieces therein, and at least one of the spindle stations being designed as workpiece insertion station, a workpiece receiving means rotatable about an axis and allocated to the workpiece insertion station, said workpiece receiving means being movable by means of a carrier device arranged on the machine frame relative to the workpiece spindle located in the workpiece insertion station with at least one directional component extending radially to the spindle drum axis between a workpiece hand-over position, in which the axis of the workpiece receiving means extends coaxially with the spindle axis of the workpiece spindle located in the workpiece insertion station, and a workpiece receiving position, and said workpiece receiving means being movable by means of the carrier device in a Z direction parallel to the spindle axis of the workpiece spindle located in the workpiece insertion station.

24. Multispindle lathe in accordance with claim 23, wherein the carrier device is mounted on the machine frame outside a spatial area extending in front of an end face of the spindle drum and away from the spindle drum.

25. Multispindle lathe in accordance with claim 23, wherein the carrier device is mounted on the machine frame on the same side of the work area as the spindle drum.

26. Multispindle lathe in accordance with claim 25, wherein the carrier device is mounted on a stand of the machine frame bearing the spindle drum.

27. Multispindle lathe in accordance with claim 23, wherein the carrier device comprises a carrying arm mounted in a carrying arm holder on the machine frame.

28. Multispindle lathe in accordance with claim 27, wherein the carrying arm is mounted in the carrying arm holder on the machine frame for displacement in a direction parallel to a spindle axis of the workpiece spindle located in the workpiece removal station.

29. Multispindle lathe in accordance with claim 23, wherein the carrier device comprises an arm pivotable about a pivot axis relative to the machine frame.

30. Multispindle lathe in accordance with claim 29, wherein the arm is pivotable about the pivot axis relative to the carrying arm.

31. Multispindle lathe in accordance with claim 29, wherein the arm is constructed as a jointed arm and comprises two sectional arms movable relative to each other about a joint.

* * * * *